July 8, 1969  W. SMITKA  3,454,879
DIRECT CURRENT SUMMING CIRCUIT WITH
COMPENSATING MEANS
Filed March 17, 1966

INVENTOR
WOLFGANG SMITKA

BY
ATTORNEY

United States Patent Office 3,454,879
Patented July 8, 1969

3,454,879
DIRECT CURRENT SUMMING CIRCUIT WITH COMPENSATING MEANS
Wolfgang Smitka, Ostliche, Germany, assignor to International Standard Electric Corporation, New York, N.Y., a corporation of Delaware
Filed Mar. 17, 1966, Ser. No. 535,125
Claims priority, application Germany, Apr. 22, 1965, St 23,718
Int. Cl. G01r 7/02
U.S. Cl. 324—117          8 Claims

ABSTRACT OF THE DISCLOSURE

A direct current summing circuit in which input signals, in proportion to their algebraic sum, vary the net current derived from alternately saturating, in opposite directions, the main winding of a ferromagnetic core transformer. Included in the circuit is a free-running multivibrator and two sources of equal potential to effect the alternate saturations of the main winding, of which the net indication therefrom of 0 current, in the absence of input currents, is recorded by an instrument connected between the main winding and a reference potential. Inputs to be summed alternate proportionally this balance by means of the transformer input windings. The switching bias for the multivibrator is derived from feedback windings on the same core. As a result of an alternating current component generated by the multivibrator which tends to affect the evaluation of input currents, compensation means are included in the form of a transformer whose primary is connected to the switching circuit and the main winding on one side and the reference potential on the other, and whose secondary windings are connected in series with the input windings.

---

The present invention relates to a DC summing and buffer amplifier. During the analogue remote transmission of measuring values, each time according to 0–100% of the measuring value to be transmitted, there are usually employed standardized input and output signals, for example, direct currents of 0–10 ma., or else DC voltages ranging between 0–10 v. In the course of this, as far as the load resistance is constant, it is possible to convert current values into voltage values and vice versa.

It is often necessary to add such measuring values, or to subtract them. To this end the currents are connected in parallel, and the voltages are connected in series. This, however, can only be carried out if the measuring values are not, for example, on account of the transmission equipment, bound to certain potentials. As a solution to this problem it is already known to employ AC voltage amplifiers and to carry out a potential separation with the aid of transformers. The DC voltage signals are thereby transformed into AC voltages ahead of the amplifier input, with the aid of a chopper, and are rectified again at the output of the amplifier. The summing of the measuring values is effected with respect to the alternating current voltage, at the input of the amplifier, so that to each input of measuring values there must be assigned a separate inverter.

According to the invention both the summing and the potential separation is effected in that a ferromagnetic core, between its positive and its negative states of saturation, is periodically remagnetized, and that the difference of the currents necessary for effecting the remagnetization of the core into either the one or the other direction, is being measured as the image of the sum of the premagnetization which each of the input currents to be seized causes via a winding associated therewith on the same core.

The invention will now be explained in detail with reference to the co-pending drawings.

In FIG. 1 there is shown the principle mode of operation of the inventive type of arrangement.

The basic principle of the invention will now be explained at first with reference to FIG. 1. In this case the transformer is built-up on a core having a magnetization curve with a sharp limitation of the saturation state. The magnetic material, of which this core is made of, has a rectangular hysteresis loop. To the main winding A (1–2), the voltage U1 is applied via the switch K which, in this particular case, is shown as a constant. This is continued until, in accordance with FIG. 2, the core has reached its state of saturation I ($+B_S$), thereupon the contact K is supposed to switch over from its position I to its position II, and thus to disconnect the voltage U1, and to apply the voltage U2 to the main winding A. The polarity of the voltage U2 is supposed to counteract the original magnetization, so that the core is remagnetized until reaching the state of saturation II ($-B_S$), whereupon the contact K again returns to its position, I and so on.

Figure 3:
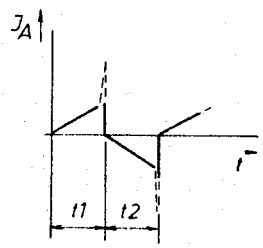
FIGS. 3 and 4 show the current curve as resulting in example of embodiment according to the invention.

At an equality of the voltages U1 and U2 and in accordance with FIG. 3, the times $t1$ and $t2$ are alike, and in the same way also the currents upon remagnetization from I to II, as well as from II to I, are alike. In the course of this they have the same shape or curve, but their effects are in opposition to one another. An instrument M connected in series with the main winding, therefore, indicates the arithmetic mean value $J_A=0$. On the transformer T there is arranged an auxiliary winding B3–4. A current $J_E$ flowing through this auxiliary winding, and representing the input signal, has an influence upon the currents which are necessary for effecting the remagnetization, via the magnetic flux $J_E \cdot W$, as caused by it, with W representing the number of turns of winding B, as is also shown in FIG. 4, because it once supports and the other time weakens the effect of the magnetizing current flowing in the winding A.

In this way the indicated current $I_A$ (as a difference of the two magnetizing current half-waves), is directly in proportion to the "input magnetic flux." The effect, as caused by the winding B, may either be supported or weakened with the aid of further windings which are traversed by further currents, with the sum of the DC magnetic fluxes of the input windings causing the indicated mean value current $I_A$, so that there will exist a linear summing-up. Since, as already mentioned hereinbefore, not the magnitude of the input currents alone, but the respectively caused magnetic flux is decisive for the indication $I_A$, it is possible, by way of a corresponding dimensioning of the number of turns of the individual input windings (B etc.), to achieve a simple conversion prior to the formation of the sum of the magnetic fluxes.

Figure 4:
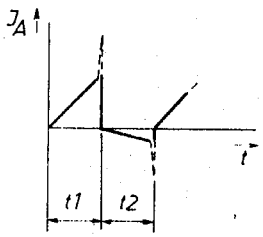

The current curves, as shown in FIGS. 3 and 4, are represented in a strongly idealized fashion. The dash-lined curves each time correspond to the considerable rise of the current in the winding A subsequently to reaching the limit of saturation of the transformer core and prior to the switching-over of the voltage.

Figure 1:
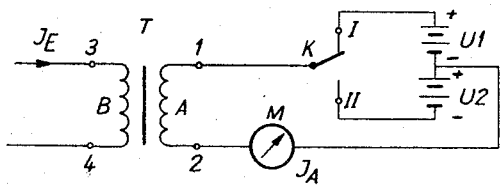
Figure 2:
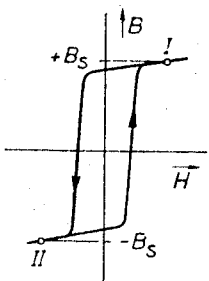
FIG. 2 shows the magnetization curve of the transformer core.
Figure 5:
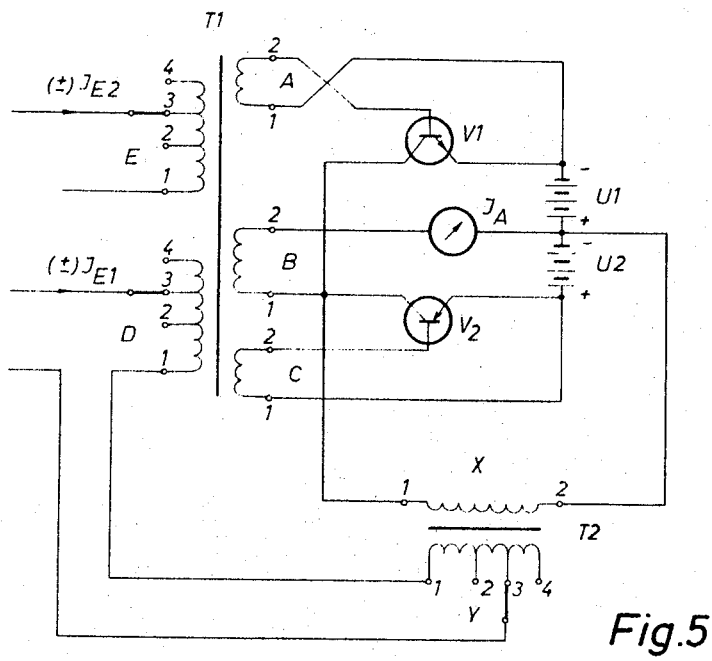
FIG. 5 shows an exemplified embodiment of the invention.

FIG. 5, in a simplified way, shows the construction of a practically designed circuit, according to the principle shown in FIG. 1.

The main winding B (1–2) of the transformer T1, as shown in FIG. 5, may be applied to the voltage U1 via the npn-type transistor V1, or else to the voltage U2 via the pnp-type transistor V2. The magnitudes of the voltages U1 and U2 are alike, and are polarized in such a way that their effects upon the winding B are in opposition to one another. The transformer T1, as shown in FIG. 1, comprises a magnetic core with a rectangular hysteresis loop. The auxiliary winding A is a feedback winding for controlling the transistor V1, so that the winding C analogously controls the transistor V2. The windings D and E are input windings for the currents to be summed, including switchover possibilities or facilities for adjusting the evaluation (conversion). For explaining the function, it will be assumed in the first place that the transistor V1 is just unblocked (conductive). On account of this the terminal 1 of the main winding B is applied to U1 terminal 2 of B is applied, via the instrument to $+U1$ (and simultaneously to $-U2$). The winding B is traversed by an approximately sawtooth-shaped increasing current, as is necessary for producing an opposing voltage $E_s = -w$.

$$F_E \frac{dB}{dt} = -w^2 \cdot \frac{F_E}{1_E} / \mu \cdot \frac{dJ}{dt} = -U1$$

The voltage, as induced in the winding A, causes a base current in the transistor V1, and keeps the latter in the unblocked or conducting state. In the winding C there is induced a voltage keeping the transistor V2 blocked (non-conducting).

As soon as the induction in the core reaches the saturation point, the current flowing in the winding B will suddenly rise strongly, because the maintenance of the opposite voltage $E_s$ requires an equal $db/dt$, but a substantially higher $dJ/dt$. As soon as this current exceeds the limiting value which the transistor V1, in accordance with the base current and its current amplification, is still capable of connecting through, the voltage starts to drop off at the transistor V1. Now the winding B receives less voltage, and consequently the transistor V1, because of the reduced induction voltage also at the winding A, will also receive less base current, and the voltage at B will further decrease until finally the transistor V1 is blocked, and the transistor V2 starts to connect through, and until the entire process is repeated. In the course of this, the winding B, via the transistor V2, is applied to the voltage U2, and the core is remagnetised from its positive towards its negative saturation point, so that the transistor V1 remains blocked, and the transistor V2 is connected through (driven into saturation).

Accordingly, the transistors V1 and V2 serve the same purpose as the contact K, shown in FIG. 1, namely that of a periodically operating switch-over device, and on account of this, as long as no input signal displaces the operating point of the transformer core, the arithmetic mean value of the current $I_A=0$ will again flow via the load shown in the form of an instrument.

The windings D and E, which may be enlarged by an arbitrary number, represent the input windings. Since in each winding there is also induced an AC voltage in accordance with the periodic switch-over of the transistors V1 and V2, one alternating current component will also flow through the signal source if the internal resistance thereof (as in the case of the original power source) is not infinitely high. This alternating current, however, acts as an additional load of the transistors V1 and V2 or of the entire circuit respectively. For the purpose of avoiding the possible trouble or interferences which may be caused thereby, a compensating circuit is contained in FIG. 5, with the aid of which this AC voltage may be compensated by means of an opposite voltage as obtained from the transformer T2. The primary winding X (1–2) of the transformer T2 is disposed to this end at the connection point between the voltage supplies U1 and U2 and the connection of the collectors of the transistors V1 and V2, so that the primary current of the transformer T2 is prevented from flowing via the indicating instrument where it would be likely to falsify the mean value of the current $I_A$. The secondary winding Y (1–3) of the transformer T2, is connected in series with the input winding D (1–3) of the transformer T1 in such a way that the rectangular voltages, as induced in each winding, will annul each other. Upon reconnecting the number of turns of the winding D, also the winding Y will have to be reconnected or rearranged, and for any further input winding E, etc., a separate compensating winding may be arranged on the transformer T2. Care will have to be taken that in spite of the sum of all premagnetisations of the transformer T2, the latter is always still supposed to work or operate below its saturation induction points. If necessary, the transformers T1 and T2 may be assembled or combined in any suitable way, so that each time for each input there is only required one winding simultaneously acting as both the input- and the compensating-winding.

While the principles of the above invention have been described in connection with specific embodiments and particular modifications thereof it is to be clearly understood that this description is made by way of example and not as a limitation of the scope of the invention.

I claim:

1. A circuit for affecting the algebraic addition of direction currents comprising:
    a ferromagnetic core;
    a main winding on said core for magnetizing said core into saturation;
    magnetizing means coupled to said main winding including feedback windings on said core and a source of potential, said magnetizing means periodically alternating the magnetization of said core between its positive and negative saturation states;
    measuring means coupled to said magnetizing means and to said main winding for measuring the average magnetizing current flowing in said winding, said magnetizing current being proportional to the algebraic sum of said direct currents; and
    compensating means coupled to at least one of said input windings and to said magnetizing means including a transformer to compensate for an AC voltage developed by said magnetizing means.

2. The circuit arrangement of claim 1 wherein at least one input winding has a variable number of turns and includes means for selecting the number of turns thereof.

3. The circuit arrangement according to claim 1 wherein the primary winding of said compensating transformer is coupled to said magnetizing means and each secondary winding is coupled to one of said input windings.

4. The circuit arrangement according to claim 3 wherein each secondary winding is coupled in series with its associated input winding.

5. The circuit arrangement according to claim 1 wherein said magnetizing means comprises:
    a first voltage source of positive polarity;
    a second voltage source of negative polarity; and
    switching means coupled to said first and second voltage sources and to at least the said main winding for periodically switching the voltage applied to said main winding between said positive and negative potentials.

6. The circuit arrangement of claim 1 wherein said magnetizing means includes a free-running multivibrator.

7. The circuit arrangement of claim 6 wherein said core has at least first and second feedback windings, a main winding, and at least one input winding thereon, wherein said magnetizing means comprises:
    a source of positive potential;
    a source of negative potential;

first and second transistors, each having base, emitter, and collector electrodes;

means coupling one end of said first feedback winding to the base electrode of said first transistor;

means coupling the other end of said feedback winding to said negative potential;

means coupling the emitter electrode of said first transistor to said negative potential;

means coupling one end of said second feedback winding to the base electrode of said second transistor;

means coupling the other end of said second feedback winding to said positive potential;

means coupling the emitter electrode of said second transistor to said positive potential;

means coupling one end of said main winding to the collector electrodes of said first and second transistors;

means coupling the other end of said main winding to said measuring means; and means coupling the other end of said measuring means to a reference potential; and wherein said compensating means includes:

said transformers having primary and secondary windings, means coupling the collector electrodes of said first and second transistors of said magnetizing means to one end of the primary winding of said transformer, means coupling the other end of said primary winding to said reference potential, and means coupling at least one of the secondary windings of said transformer in series with at least one input winding.

8. The circuit arrangement of claim wherein the core of said transformer and the said ferromagnetic core are common.

References Cited

UNITED STATES PATENTS

| | | | |
|---|---|---|---|
| 2,994,840 | 8/1961 | Dorsman | 332—12 |
| 3,089,999 | 5/1963 | Dortort | 324—117 XR |
| 3,136,948 | 6/1964 | Windsor | 324—117 XR |
| 3,183,498 | 5/1965 | Midas et al. | 324—117 XR |
| 3,202,916 | 8/1965 | Savastano | 324—117 XR |
| 3,275,949 | 9/1966 | Johnson | 330—8 XR |

FOREIGN PATENTS 1,145,964   3/1963   Germany.

RUDOLPH V. ROLINEC, *Primary Examiner.*

G. R. STRECKER, *Assistant Examiner.*

U.S. Cl. X.R.

324—87; 330—8; 332—12